(12) United States Patent
Borst et al.

(10) Patent No.: US 8,220,774 B2
(45) Date of Patent: Jul. 17, 2012

(54) PROPORTIONAL PILOT ACTING VALVE (75) Inventors: Laurence Vaughan Borst, Long Valley, NJ (US); Frank Alan Ferrarese, West Caldwell, NJ (US); Vincent Cole, Rockaway, NJ (US)

(73) Assignee: Automatic Switch Company, Florham Park, NJ (US)

( * ) Notice: Subject to any disclaimer, the term of this patent is extended or adjusted under 35 U.S.C. 154(b) by 541 days.

(21) Appl. No.: 12/433,158

(22) Filed: Apr. 30, 2009

(65) Prior Publication Data

US 2010/0276615 A1 Nov. 4, 2010

(51) Int. Cl.
*F16K 31/12* (2006.01)
(52) U.S. Cl. .............. 251/30.02; 251/30.03; 251/129.08
(58) Field of Classification Search .................. 251/28, 251/30.01, 30.02, 30.03, 129.08
See application file for complete search history.

(56) References Cited

U.S. PATENT DOCUMENTS

| | | | | |
|---|---|---|---|---|
| 2,102,076 | A | * | 12/1937 | Johnson ................... 251/30.01 |
| 3,390,943 | A | * | 7/1968 | Myers ............................. 431/78 |
| 3,433,262 | A | * | 3/1969 | Ray ............................ 137/614.19 |
| 5,676,342 | A | | 10/1997 | Otto et al. |
| 6,109,291 | A | * | 8/2000 | Yoshimura ................... 137/269 |
| 6,601,821 | B2 | | 8/2003 | Tyler |
| 6,883,320 | B2 | | 4/2005 | Tyler |
| 6,923,197 | B2 | * | 8/2005 | Vitale ............................. 137/12 |

FOREIGN PATENT DOCUMENTS

WO 0161226 8/2001

OTHER PUBLICATIONS

Asco Valve, Inc. "ASCO 8290 Series Accessories—Compact Positioners for Proportional Control." ASCO 8290 Series—Angle Body Pistons Valve Catalog, Feb. 2008, p. 10.

* cited by examiner

*Primary Examiner* — Dinh Q Nguyen
(74) *Attorney, Agent, or Firm* — Locke Lord LLP (57) ABSTRACT

A valve assembly comprising a pilot valve; a solenoid; and a main valve, the main valve having an actuator in communication with a pressure control; the pilot valve may facilitate opening the main valve in proportion to an energized level of the solenoid. The solenoid may move the first disc to isolate the inlet port from the pressure control and/or move the second disc to communicate the outlet port with the pressure control. The actuator may move the second disc to isolate the outlet port from the pressure control and/or move the first disc to communicate the inlet port with the pressure control. The pilot valve may isolate both the inlet port and the outlet port from the pressure control when the pilot valve experiences forces in equilibrium from the solenoid and the actuator.

20 Claims, 4 Drawing Sheets

PROPORTIONAL PILOT ACTING VALVE

CROSS REFERENCE TO RELATED APPLICATIONS

None.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to solenoid controlled valves; and more specifically relate to solenoid controlled pilot operated valves for air service.

2. Description of the Related Art

U.S. Pat. No. 5,676,342 discloses a "proportional flow valve wherein inlet fluid pressure urges a main valve unit having a main valve member and a surrounding diaphragm toward the valve seat. The diaphragm is connected to the valve body and has a bleed passageway to enable inlet fluid to pass from an inlet port below the main valve unit to a reservoir above it. The area of the main valve unit exposed to the reservoir is substantially greater than the area of the main valve unit exposed to the inlet port. A solenoid actuator determines the position of a pilot valve sealing member which controls the flow of inlet fluid from the reservoir through a pilot opening in the main valve member to an outlet port to selectively relieve the pressure above the main valve unit thereby permitting the main valve unit to move away from the main valve seat."

U.S. Pat. No. 6,601,821 discloses a "two-stage proportional control valve assembly regulates flow of a first fluid such as an engine exhaust gas using a second fluid such as engine oil for power. A directional valve under control of an electrical actuator regulates flows of the second fluid to operate a fluid-powered actuator. A mechanical connection between the fluid powered actuator and a flow control valve for regulating flows of the first fluid enables the electrical actuator to indirectly control the flow control valve with a minimum draw."

U.S. Pat. No. 6,883,320 discloses a "servomechanism for a valve controlling engine intake flow via a cooler and a bypass uses a proportional solenoid operating a hydraulic valve to power a hydraulic actuator setting the position of the control valve. An engine sensor and electric controller provide input to the proportional solenoid, and feedback from the position of the control valve is applied to the hydraulic valve by a cam and spring applying a force in opposition to the proportional solenoid."

International Publication No. WO 01/61226 discloses an "extended range proportional valve (10) which can control rates of mass flow over continuous low, intermediate, and high ranges has a pilot member (68) mounted on an armature (84) of a solenoid which can be dithered onto and off of a pilot opening (58) in a main valve member (30) which seals a main valve opening (18) to control mass flow rates over the low range by varying the duty cycle and/or frequency of a pulse width modulated current in the solenoid coil. Intermediate and high flow rates are achieved by dithering the pilot valve member (68) with a duty cycle and/or frequency sufficient to raise the main valve member (30) relatively short and relatively long respective distances from the main valve seat (18)."

An ASCO Valve, Inc. catalog, dated Feb. 2008, discloses, among other things, a compact positioner that "[v]aries flow proportional to a 0-10 VDC, 0-20 mA or 4-20 mA control signal."

The inventions disclosed and taught herein are directed to an improved solenoid controlled pilot operated valve.

BRIEF SUMMARY OF THE INVENTION

In one embodiment, the present invention includes a valve assembly comprising a pilot valve having a body with an inlet port and an outlet port, a first disc, and a second disc; a solenoid configured to operate the pilot valve; and a main valve having an actuator interfaced with the pilot valve, a main inlet in communication with the inlet port, and a main outlet; the pilot valve may be configured to facilitate opening the main valve in proportion to an energized level of the solenoid. The discs may be configured to move with respect to the body to selectively communicate either the inlet port or the outlet port with a pressure control to operate the actuator. More specifically, the solenoid may be configured to move the first disc toward the body to isolate the inlet port from the pressure control when the solenoid is energized. The solenoid may also be configured to move the second disc away from the body to communicate the outlet port with the pressure control when the solenoid is energized. The actuator may be configured to move the second disc of the pilot valve toward the body to isolate the outlet port from the pressure control. The pilot valve may isolate both the inlet port and the outlet port from the pressure control when the pilot valve experiences forces in equilibrium from the solenoid and the actuator. The actuator and the pilot valve may be mechanically linked through a feedback spring.

In another embodiment, the present invention includes a valve assembly comprising a pilot valve having a body with an inlet port and an outlet port, a first disc, and a second disc; a solenoid configured to selectively exert force on the first disc; and a main valve having a main inlet, a main outlet, and an actuator configured to push a feedback spring to exert force on the second disc. The discs may be configured to move with respect to the body to selectively communicate either the inlet port or the outlet port with a pressure control. The pilot valve may be configured to facilitate opening the main valve in proportion to an energized level of the solenoid. The solenoid may be configured to move a first holder toward the body when the solenoid is energized, the first holder slidably containing the first disc, thereby isolating the inlet port from the pressure control. The solenoid may also be configured to move the second disc away from the body when the solenoid is energized, thereby communicating the outlet port with the pressure control. The feedback spring may be configured to move the second disc toward the body to isolate the outlet port from the pressure control. The feedback spring may be configured to move the first holder away from the body and a second holder toward the body, the first holder slidably containing the first disc to isolate the inlet port from the pressure control, and the second holder containing the second disc to isolate the outlet port from the pressure control. The pilot valve may isolate both the inlet port and the outlet port from the pressure control when the pilot valve experiences forces in equilibrium from the solenoid and the feedback spring. The pilot valve may further include a rod extending between the discs through the body, the rod communicating force between the solenoid and the feedback spring.

In another embodiment, the present invention includes a valve assembly comprising: a three-way poppet pilot valve having a body with an inlet port and an outlet port, a first disc, a first holder slidably containing the first disc, a second disc, with the discs being configured to move with respect to the body to selectively communicate either the inlet port or the outlet port with a pressure control; a solenoid configured to, when energized, move the first holder toward the body, thereby isolating the inlet port from the pressure control, and move the second disc away from the body, thereby communicating the outlet port with the pressure control; and a main valve having a main inlet in communication with the inlet port, a main outlet, and an actuator configured to, when the main valve has opened in proportion to an energized level of the solenoid, push a feedback spring to move the second disc toward the body thereby isolating the outlet port from the pressure control. The pilot valve may isolate both the inlet port and the outlet port from the pressure control when the pilot valve experiences forces in equilibrium from the solenoid and the feedback spring.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Figure 1:
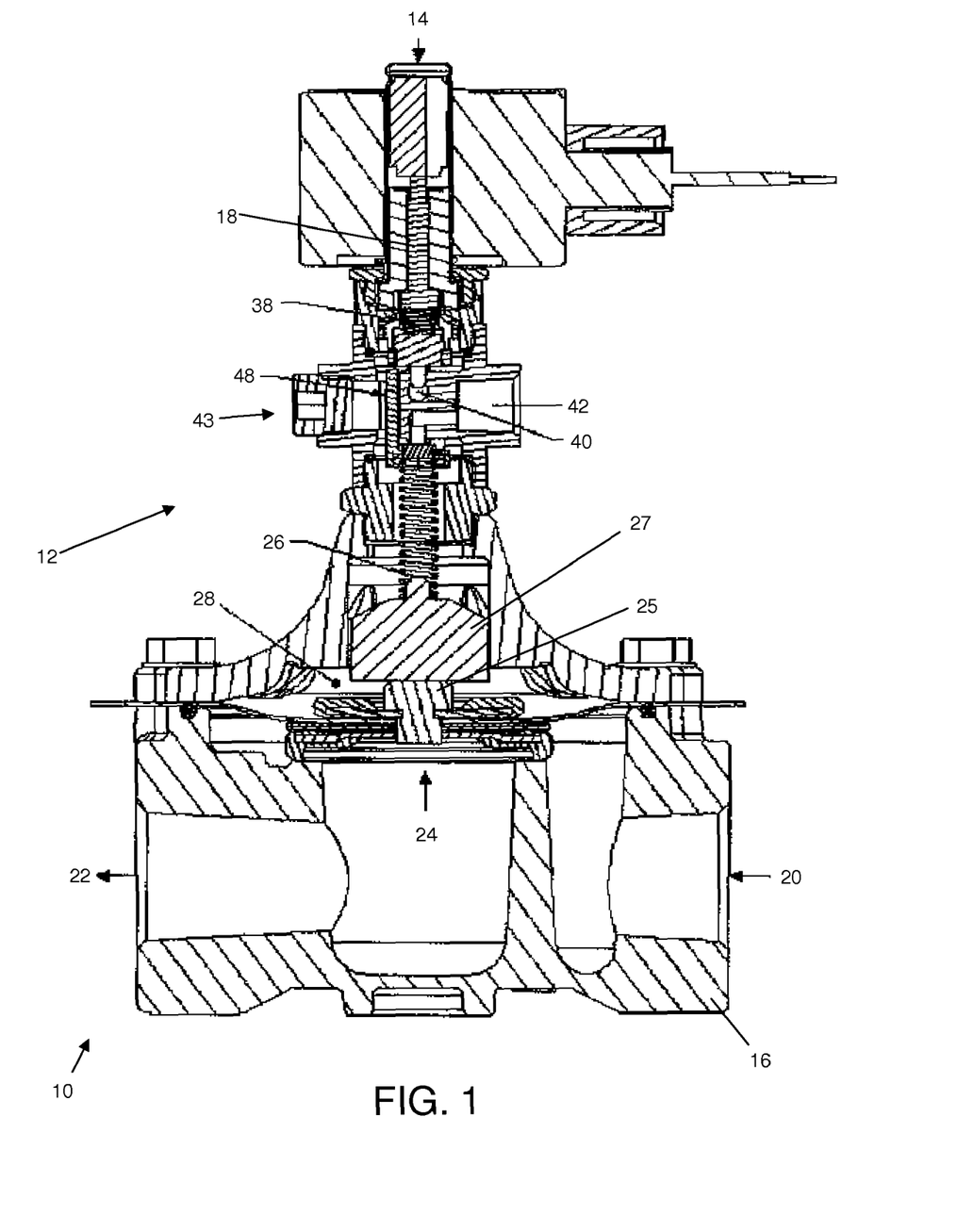
FIG. 1 illustrates a front sectional view a particular embodiment of a valve assembly utilizing certain aspects of the present inventions.
Figure 2:
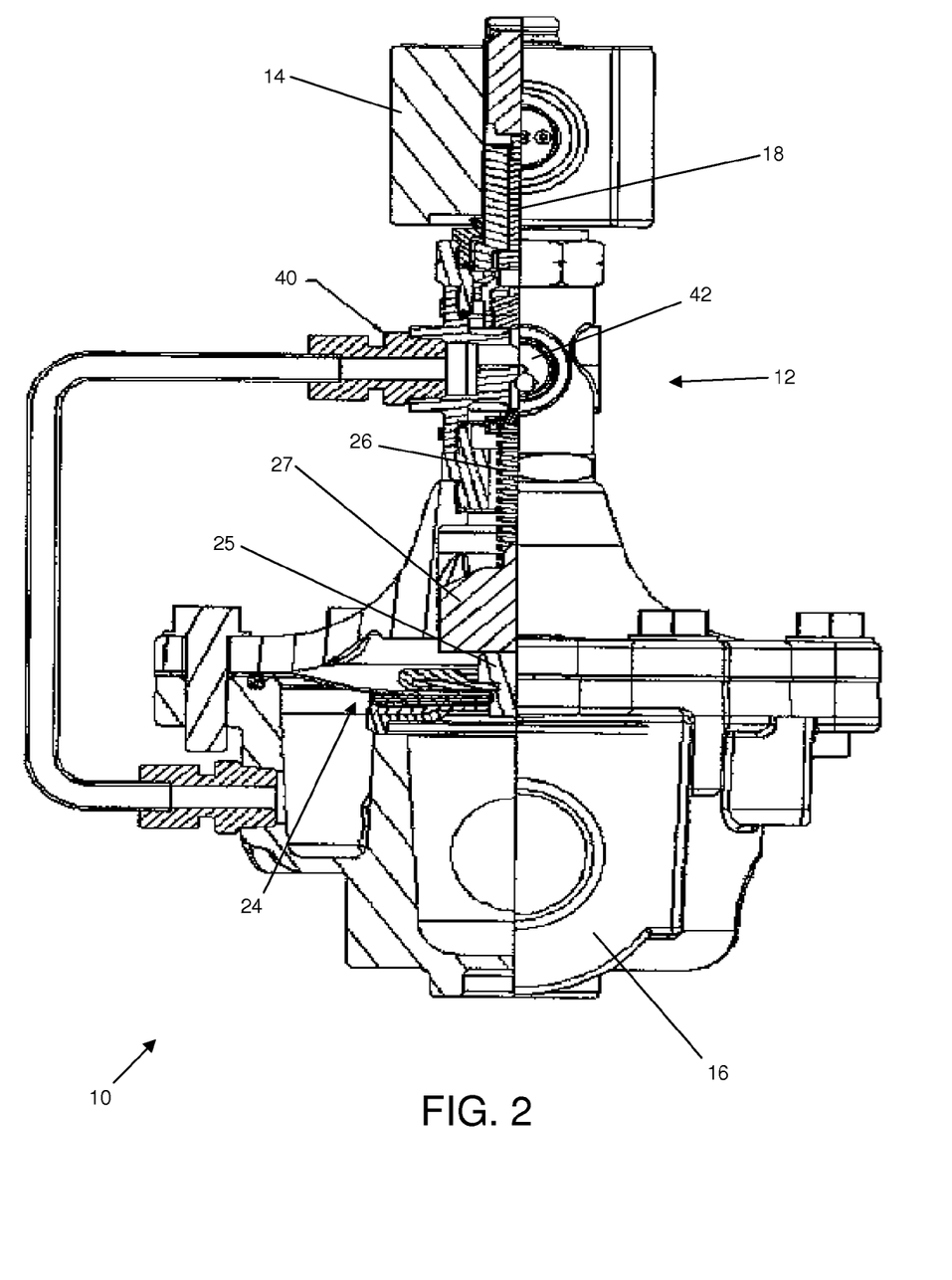
FIG. 2 illustrates a side cut-away view of the valve assembly utilizing certain aspects of the present inventions.

Applicants have created a valve assembly comprising a pilot valve having a body with an inlet port and an outlet port, a first disc, and a second disc; a solenoid configured to operate the pilot valve; and a main valve having an actuator interfaced with the pilot valve, a main inlet in communication with the inlet port, and a main outlet; the pilot valve may be configured to facilitate opening the main valve in proportion to an energized level of the solenoid. The discs may be configured to move with respect to the body to selectively communicate either the inlet port or the outlet port with a pressure control to operate the actuator. More specifically, the solenoid may be configured to move the first disc toward the body to isolate the inlet port from the pressure control when the solenoid is energized. The solenoid may also be configured to move the second disc away from the body to communicate the outlet port with the pressure control when the solenoid is energized. The actuator may be configured to move the second disc of the pilot valve toward the body to isolate the outlet port from the pressure control. The pilot valve may isolate both the inlet port and the outlet port from the pressure control when the pilot valve experiences forces in equilibrium from the solenoid and the actuator. The actuator and the pilot valve may be mechanically linked through a feedback spring FIG. 1 and FIG. 2 are illustrations of a valve assembly 10 utilizing certain aspects of the present inventions. In one embodiment, the valve assembly 10 includes a pilot valve 12, a solenoid 14 to operate the pilot valve 12, and a main valve 16 interfaced with the pilot valve 12. The solenoid 14 is preferably similar to the type commonly used in process control applications and is energized by passing a current therethrough. The current flows through a coil producing a magnetic field, which in turn moves a plunger 18 in and out to exert physical force on the pilot valve 12, as will be discussed in greater detail below.

The main valve 16 is preferably similar to the type commonly used in process control applications and includes an inlet 20 and an outlet 22 to selectively control the flow of a fluid or gaseous media, such as air. More specifically, the main valve 16 preferably includes an actuator 24, such as a piston or diaphragm, that opens and closes the main valve 16 to pass or restrict the media therethrough. The diaphragm of the actuator 24 may be held together with a rivet 25.

The actuator 24 interfaces with the pilot valve 12, such as through a feedback spring 26 and/or a pressure control passageway 28, as will be discussed in greater detail below. More specifically, in one embodiment, the rivet 25, or another portion of the actuator 24, may be mechanically linked with a spring guide 27 that guides, or centers, the feedback spring 26 within a housing of the assembly 10. Together, the feedback spring 26 and the spring guide 27 may extend between the pilot valve 12 and the actuator 24. Thus, one may tune the interaction between the pilot valve 12 and the actuator 24 by changing the feedback spring 26 and/or the spring guide 27. Alternatively, the pressure control passageway 28 may be in communication with the actuator 24, as described, with some other portion of the main valve 16 providing feedback to, or linked to, the pilot valve 12.

Figure 3:
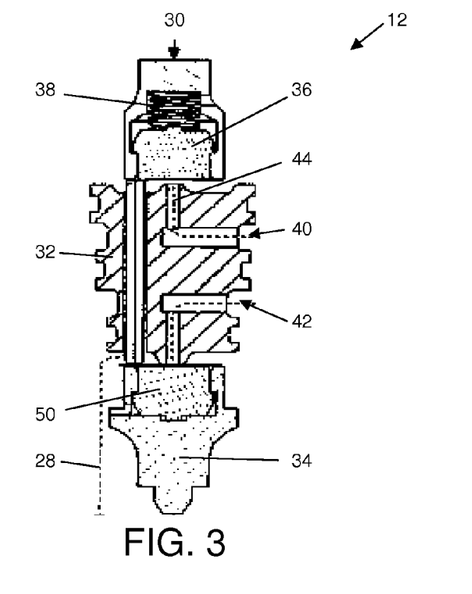
FIG. 3 illustrates a close-up sectional view of a pilot valve of the valve assembly utilizing certain aspects of the present inventions, with a solenoid de-energized.

FIG. 3 is an illustration of one embodiment of select components of the pilot valve 12 utilizing certain aspects of the present inventions. In FIG. 3, the pilot valve 12 is in a first position, or state, with the solenoid 14 de-energized and the main valve 16 closed, or closing. The pilot valve 12 may include a first holder 30, a stationary body 32, and a second holder 34. The first holder 30 may be mechanically linked with the plunger 18 of the solenoid 14 and therefore may move with the plunger 18. For example, the first holder 30 may be in direct contact with the plunger 18 and slide along an axis parallel to that of the plunger 18. Alternatively, the first holder 30 may be indirectly linked to the plunger 18. In one embodiment, the first holder 30 contains a first disc 36. The disc 36 may slide within the holder 30. The first holder 30 may also contain a disc spring 38 that pushes the first disc 36 toward the body 32.

The body 32 may include an inlet port 40 and an outlet, or exhaust, port 42. The inlet port 40 may be in communication with the inlet 20 of the main valve 16, and therefore the pilot valve 12 may operate with the same media, such as fluid or gas, as the main valve 16. This may eliminate the need for additional or external pilot media. The outlet port 42 may exhaust, or vent, to the atmosphere. This may be advantageous where the media is air, or another inert gas. Alternatively, the outlet port 42 may be connected to a reservoir or be in communication with the outlet 22 of the main valve 16. This may be advantageous where the media is expensive and/or hazardous.

As can be seen in FIG. 3, the pilot valve 12 of one embodiment comprises a three-way poppet-type valve. As such, the pilot valve 12 may have a common port 43 (as shown in FIG. 1). In one embodiment, the common port 43 is plugged and internally communicated to, or as, the pressure control passageway 28. Thus, the pressure control passageway 28 may replace, or be substituted for, the common port 43. Alternatively, the common port 43 may be piped to, or otherwise communicated with, an external pressure control passageway 28.

The body 32 may also include an inlet passage 44 in communication with the inlet port 40. In one embodiment, when the solenoid 14 is de-energized as shown in FIG. 3, the feedback spring 26 pushes the first holder 30 and first disc 36 up and away from the body 32, such that the first disc 36 is offset from the inlet passage 44, thereby permitting communication between the pressure control passageway 28 and the inlet port 40. Alternatively, or additionally, the plunger 18 may pull the first holder 30 away from the body 32, thereby permitting or assisting communication between the pressure control passageway 28 and the inlet port 40

With the pressure control passageway 28 and the inlet port 40 in communication, the media may flow from the inlet 20, through the inlet port 40, through the inlet passage 44, and through the pressure control passageway 28 to the actuator 24. Thus, the pressure on both sides of the actuator 24 will equalize. However, because of greater area on one side of actuator 24, the pressure will operate the actuator 24, thereby operating the main valve 16. More specifically, in one embodiment, a top side of the diaphragm of the actuator 24 has more surface area exposed to the pressure control passageway 28 than a bottom side of the diaphragm of the actuator 24 has exposed to the inlet 20 of the main valve 16. Thus, when the same pressure, such as that at the inlet 20 of the main valve 16, is communicated to both the top and bottom of the diaphragm of the actuator 24, the top of the diaphragm actually experiences a greater differential pressure, or force, and therefore exerts a downward force on the actuator 24, thereby operating the main valve 16.

In one embodiment, with the solenoid 14 de-energized as shown in FIG. 3, the actuator 24 will close the main valve 16. The assembly 10 may be configured in this manner to provide a fail-closed operation. However, in other applications, the assembly 10 may be modified such that the actuator 24 will open the main valve 16 with the solenoid 14 de-energized. For example, the inlet and outlet ports 40,42 may be swapped. Alternatively, the actuator 24 may be reconfigured and/or re-plumbed; and/or the relationship between the pilot valve 12 and the actuator 24 may be reconfigured.

Figure 4:
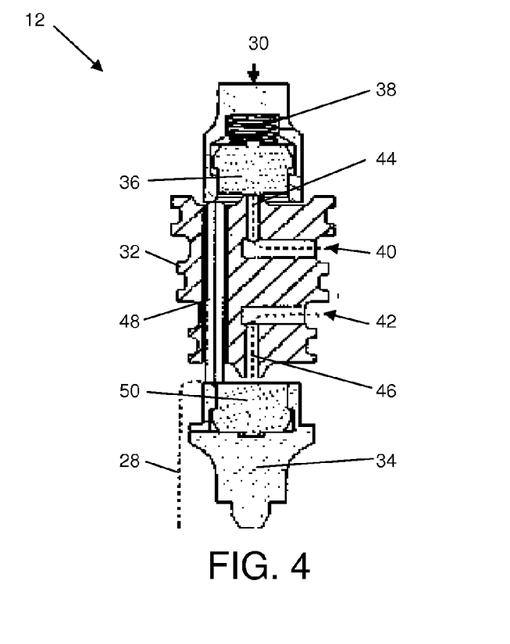
FIG. 4 illustrates a close-up sectional view of the pilot valve of the valve assembly utilizing certain aspects of the present inventions, with the solenoid energized.

FIG. 4 is an illustration of one embodiment of select components of the pilot valve 12 utilizing certain aspects of the present inventions. In FIG. 4, the pilot valve 12 is in a second position, or state, with the solenoid 14 energized and the main valve 16 opening. The body 32 may also include an outlet passage 46 in communication with the outlet port 42. The pilot valve 12 may further include a rod 48 extending between the first holder 30 and the second holder 34. In one embodiment, the rod 48 extends through the body 32 and spans a length equal to a distance between the apertures, or orifices, of the inlet and outlet passages 44,46. In another embodiment, the rod 48 extends through the body 32 and spans a length slightly less than the distance between the apertures of the inlet and outlet passages 44,46. In any case, there may be one, two, three, or more rods 48. In one preferred embodiment, there are three rods 48, arranged to help keep the holders 30,34 properly aligned.

In one embodiment, when the solenoid 14 is energized as shown in FIG. 4, the plunger 18 pushes the first holder 30 toward the body 32, such that the first disc 36 seals off the inlet passage 44, thereby isolating the pressure control passageway 28 from the inlet port 40. The plunger 18, either directly or though the first holder 30 and/or first disc 36, also pushes the rod 48 toward the second holder 34 and/or a second disc 50 contained therein. Thus, the plunger 18, through the rod 48, also pushes the second holder 34 and/or the second disc 50 away from the body 32, such that the second disc 50 is offset from the outlet passage 46, thereby permitting communication between the pressure control passageway 28 and the outlet port 42. With the pressure control passageway 28 in communication with the outlet port 42, the media may flow from the actuator 24, through the pressure control passageway 28, through the outlet passage 46, and exhaust through the outlet port 42. With normal process system pressure on one side of the actuator 24 and atmospheric, or whatever pressure exists beyond the outlet port 42, the actuator 24 is imbalanced and therefore operates to open, or close, the main valve 16. For example, in one embodiment, with the solenoid 14 energized as shown in FIG. 4, the actuator 24 will open the main valve 16. However, in other applications as discussed above, the assembly 10 may be modified such that the actuator 24 will close the main valve 16 with the solenoid 14 energized.

In one embodiment, as the actuator 24 operates, opening or closing the main valve 16, the actuator 24 pushes the feedback spring 26 toward the pilot valve 12. More specifically, the actuator 24 pushes the spring guide 27; which pushes the feedback spring 26 into the second holder 34 of the pilot valve 12, thereby exerting force on the pilot valve 12. This force exerted by the feedback spring 26 and/or actuator 24 changes as the main valve 16 opens or closes. In one embodiment, the force exerted by the feedback spring 26 and/or actuator 24 increases as the main valve 16 opens. However, in other applications, the assembly 10 may be modified such that the force exerted by the feedback spring 26 and/or actuator 24 decreases as the main valve 16 opens, or increases as the main valve 16 closes.

Figure 5:
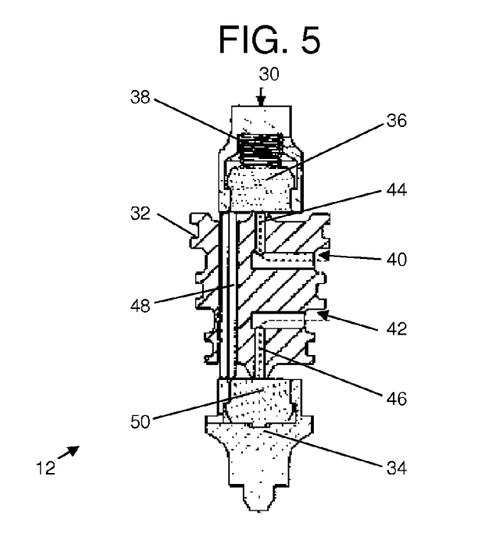
FIG. 5 illustrates a close-up sectional view of the pilot valve of the valve assembly utilizing certain aspects of the present inventions, with the pilot valve in equilibrium.

FIG. 5 is an illustration of one embodiment of select components of the pilot valve 12 utilizing certain aspects of the present inventions. In FIG. 5, the pilot valve 12 is in a third position, or state, with the solenoid 14 energized and the main valve 16 open in proportion to an energized level of the solenoid 14. Here, the pilot valve 12 is in equilibrium. More specifically, the plunger 18 of the solenoid 14 is exerting a level of force on the first holder 30 equal, or substantially equal, to the level of force exerted on the second holder 34 by the feedback spring 26 and/or actuator 24. In this third equilibrium state, both the first and second discs 36,50 seal against the body 32, thereby isolating both the inlet and outlet ports 40,42 from the pressure control passageway 28.

In other words, the actuator 24, acting through the feedback spring 26, pushes on the second holder 34 and/or second disc 50, thereby pushing on the rod 48, thereby pushing on the first holder 30 and/or first disc 36. When the force exerted by the actuator 24 and/or feedback spring 26 is roughly equal that of the force exerted by the plunger 18 of the solenoid 14, the first holder 30 retreats slightly from the body 32, thereby allowing the second disc 50 to seal off the outlet port 42 from the pressure control passageway 28. As the first holder 30 retreats the body 32, the disc spring 38 pushes the first disc 36 against the body 32, causing the first disc 36 to slide within the first holder 30 and keep the inlet port 40 isolated from the pressure control passageway 28.

The first disc's 36 ability to slide within the first holder 30 allows the pilot valve 12 to open and/or close communication between the outlet port 42 and the pressure control passageway 28, while keeping the inlet port 40 isolated from the pressure control passageway 28. The force exerted by the disc spring 38 is of a magnitude much less than that expected from either the solenoid 14 or the feedback spring 26, and is therefore negligible in most circumstances. However, especially in cases where the select components of the pilot valve 12 become contaminated or otherwise do not move as freely as desired, with the force exerted by the solenoid 14 being roughly equal to the force exerted by the feedback spring 26 and the rod 48 pinned between the first and second holders 30,34, the disc spring 38 may be of sufficient strength to move the first and second holders 30,34 to isolate both the inlet and outlet ports 40,42 from the pressure control passageway 28.

In one embodiment, the discs 36,50 are preferably resilient. For example, the discs 36,50 may be made of an elastomer, or another resilient material, while other components of the pilot valve 12 are preferably made of metal, or another rigid material. The holders 30,34, discs 36,50, and/or rod 48, as well as other components of the assembly 10, are preferably configured to accommodate manufacturing tolerances and still allow full functionality of the assembly 10. The degree to which the discs 36,50 may compress and/or slide within their respective housings 30,34 and the length of the rod(s) 48, among other things, accommodate manufacturing tolerances and still allow full functionality of the assembly 10. For example, the more that the discs 36,50 may compress and/or slide within their respective housings 30,34, the more over-travel they can accommodate. Rod(s) 48 sized slightly shorter than the distance between the apertures of the inlet and outlet passages 44,46, can take advantage of the over-travel. The use of greater over-travel, in turn, prevents manufacturing tolerances from inhibiting functionality of the assembly 10.

Figure 6:
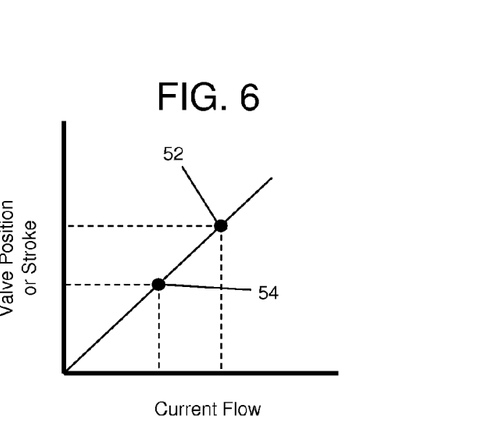
FIG. 6 illustrates a graph showing a potential relationship between the position or stroke of a main valve and current flow through the solenoid utilizing certain aspects of the present inventions.

In any case, with both the inlet and outlet ports 40,42 isolated from the pressure control passageway 28, the cumulative forces on both sides of the actuator 24 remains constant, thereby holding the actuator 24 in a given position. This third equilibrium position allows the main valve 16 to maintain a given position for a given current flow through the solenoid 14, as shown in FIG. 6. As can also be seen in FIG. 6, the position of the main valve 16 may be proportionally controlled between fully closed, a first position 52, a second position 54, fully opened, and anywhere in between, by merely proportionally changing the level, or amount, current flowing through the solenoid 14.

Thus, it can be seen that the pilot valve 12 of the present invention can be used to proportionally operate the main valve 16. More specifically, the pilot valve 12 may be used to open the main valve 16 proportionally to the current flowing through the solenoid 14. Using the pilot valve 12 of the present invention, one may open the main valve 16 to a first position by causing a first level of current to flow through the solenoid 14. If one wishes to open the main valve 16 further to a second position, one need only increase the current flowing through the solenoid 14 to a second level. Similarly, if one wishes to open the main valve 16 further to a third position, one need only increase the current flowing through the solenoid 14 to a third level.

Ideally, it can be seen that the positions to which the main valve 16 may be opened is only limited by the possible levels, or resolution, of current one may be able to cause to flow through the solenoid 14. In a preferred embodiment, the current flowing through the solenoid 14 is infinitely adjustable, and therefore the main valve 16 may be opened and/or closed to an infinite number of positions.

Figures 7, 8, 9:
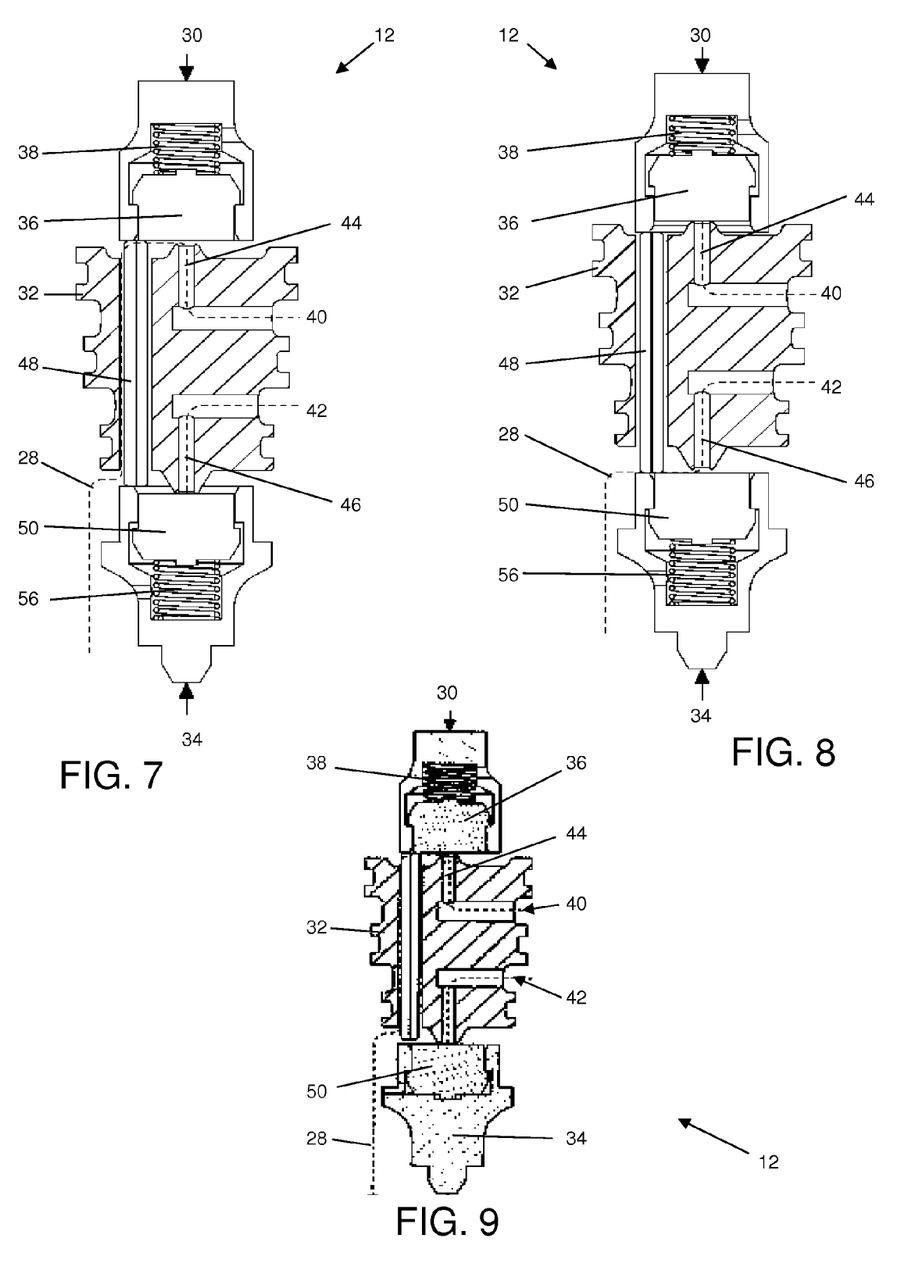
FIG. 7 illustrates a close-up sectional view of a second embodiment of the pilot valve of the valve assembly utilizing certain aspects of the present inventions, with the solenoid de-energized.
FIG. 8 illustrates a close-up sectional view of the second embodiment of the pilot valve of the valve assembly utilizing certain aspects of the present inventions, with the solenoid energized.
FIG. 9 illustrates a close-up sectional view of a third embodiment of the pilot valve of the valve assembly utilizing certain aspects of the present inventions, with the solenoid de-energized.

As discussed above, the second disc 50 may also slide and/or compress within the second holder 34, in select embodiments. More specifically, as discussed above, the embodiment shown in FIG. 3, the second disc 50 compresses to allow the force exerted by the actuator 24 and/or feedback spring 26 to be transmitted to the first holder 30. In another embodiment, as shown in FIG. 7 and FIG. 8, the second holder 34 includes a second disc spring 56. The second disc spring 56 compresses, or collapses, thereby allowing the second disc 50 to slide within the second holder 34 to allow the force exerted by the actuator 24 and/or feedback spring 26 to be transmitted to the first holder 30.

In either case, as the current in the solenoid 14 is increased, so too is the force exerted by the plunger 18 upon the first holder 30. The increased force exerted by the plunger 18 overcomes the force exerted by the actuator 24 and/or feedback spring 26, thereby shifting the pilot valve 12 into the second state, as shown in FIG. 4 and FIG. 8. The main valve 16 opens until the force exerted by the actuator 24 and/or feedback spring 26 increases to match the force exerted by the plunger 18, thereby shifting the pilot valve 12 in the third state, as shown in FIG. 5. Thus, the assembly 10 automatically seeks the third equilibrium state, thereby holding the main valve 16 in a given position for a given current flow through the solenoid 14.

More specifically, as discussed above, the first disc 36 slides, and may compress, within the first holder 30. Thus, the increased force exerted by the plunger 18 upon the first holder 30, moves the first holder 30 toward the body 32. The first disc 30 does not move significantly with the first holder 30, as the body 32 prevents further movement of the first disc 36. Rather, the first disc 36 slides back into the first holder 30.

As also discussed above, the rod(s) 48 span a length equal to or slightly less than the distance between the apertures of the inlet and outlet passages 44,46. In one embodiment, the rods 48 are approximately thirteen thousandths of an inch shorter than the distance between the apertures. Thus, as the first holder 30 moves toward the body 32, the first holder pushes the rod(s) 48 toward the second holder 34. As a result, the increased force exerted by the plunger 18 also moves the second holder 34 away from the body 32, thereby lifting the second disc 50 off the body 32 and communicating the pressure control passageway 28 with the outlet port 42. As discussed above, with the pressure control passageway 28 in communication with the outlet port 42, the media leaves the actuator 24, thereby opening the main valve 16 until the force exerted by the actuator 24 and/or feedback spring 26 increases to match the force exerted by the plunger 18, and equilibrium is established in the pilot valve 12 as shown in FIG. 5.

Likewise, it can be seen that one may move the other way. As the current in the solenoid 14 is decreased, so too is the force exerted by the plunger 18 upon the first holder 30. Thus, the force exerted by the actuator 24 and/or feedback spring 26 overcomes the decreased force exerted by the plunger 18, thereby shifting the pilot valve 12 into the first state, as shown in FIG. 3. The main valve 16 closes until the force exerted by the actuator 24 and/or feedback spring 26 decreases to match the force exerted by the plunger 18, thereby shifting the pilot valve 12 in the third state, as shown in FIG. 5.

More specifically, as discussed above, the second disc 50 compresses and/or slides within the second holder 34. Thus, as the force exerted by the plunger 18 upon the first holder 30 is decreased, the force exerted by the actuator 24 and/or feedback spring 26 moves the second holder 34 toward the body 32. The body 32 prevents further movement of the second disc 50. Therefore, the second disc 50 compresses, as shown in FIG. 3, and/or slides, as shown in FIG. 7, back into the second holder 34. As a result, the force exerted by the actuator 24 and/or feedback spring 26, through the rod(s) 48, moves the first holder 30 away from the body 32, thereby lifting the first disc 36 off the body 32 and communicating the pressure control passageway 28 with the inlet port 40. As discussed above, with the pressure control passageway 28 in communication with the inlet port 40, the media enters the actuator 24, thereby closing the main valve 16 until the force exerted by the actuator 24 and/or feedback spring 26 decreases to match the force exerted by the plunger 18, and equilibrium is established in the pilot valve 12 as shown in FIG. 5.

In another embodiment, referring also to FIG. 9, where the second disc 50 is more rigidly mounted in the second holder 34, the assembly 10 may hold a position as current flow through the solenoid 14 is reduced. For example, as the current in the solenoid 14 is decreased, so too is the force exerted by the plunger 18 upon the first holder 30. However, where the second disc 50 is rigidly mounted in the second holder 34, the second disc 50 may prevent the force exerted by the actuator 24 and/or feedback spring 26 from being transferred to the first holder 30 keeping the first disc 36 against the body 32.

If closing the main valve 16 is desired, the solenoid 14 may be completely de-energized. Completely de-energizing the solenoid 14 may pull the plunger 18, and the first holder 30, back away from the body, shifting the pilot valve 12 into a modified version of the first state, as shown in FIG. 9. Alternatively, completely de-energizing the solenoid 14 may allow the force exerted by the actuator 24 and/or feedback spring 26 to overcoming the rigidity of the second disc 50 and shift the pilot valve 12 into the first state, as shown in FIG. 3. In either case, this allows the media to build pressure against the actuator 24, thereby closing the main valve 16. Once the desired main valve position is attained, the solenoid 14 may be re-energized, thereby re-isolating both the inlet and outlet ports 40,42 from the pressure control passageway 28, and shifting the pilot valve 12 into the third state, as shown in FIG. 5. Alternatively, the solenoid 14 may be de-energized until the main valve 16 closes, and then re-energized with a current level in proportion to the desired position of the main valve 16.

Thus, it can be seen, that in one embodiment of the present invention further opening of the main valve 12 merely requires increasing the current through the solenoid 14. Once the desired position of the main valve 12 has been achieved, the current in the solenoid 14 may actually be decreased to a level that will satisfactorily maintain the first disc 36 against the inlet passage 44 and effectively isolate the inlet port 40 from the pressure control passageway 28. The force of the feedback spring 26 will maintain the second disc 50 against the outlet passage 46, effectively isolating the outlet port 42 from the pressure control passageway 28. Thus, the main valve 16 may be held in the desired position with a reduced current through the solenoid 14, the reduced current being less than that required to open the main valve 16 to the desired position. This mode of operation may be desirable in applications especially sensitive to power consumption. This embodiment requires little, if any, over-travel. This embodiment may be achieved, for example, using a shorter rod(s) 48 and/or stiffer second disc 50.

Other and further embodiments utilizing one or more aspects of the inventions described above can be devised without departing from the spirit of Applicant's invention. For example, the rod 48 may be slightly longer than the distance between the apertures of the inlet and outlet passages 44,46. Alternatively, as discussed above the rods 48 may be equal to the distance between the apertures. In still other embodiments, the rods 48 may be up to fifteen thousandths of an inch shorter than the distance between the apertures. In still other embodiments, the rods 48 may be between five and twenty-five thousandths of an inch shorter than the distance between the apertures. In still other embodiments, the rods 48 may be between one and five hundredths of an inch shorter than the distance between the apertures. Further, the various methods and embodiments of the present invention can be included in combination with each other to produce variations of the disclosed methods and embodiments. Discussion of singular elements can include plural elements and vice-versa. Finally, as discussed above, the opening and closing configuration of the assembly 10 may be reversed.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A valve assembly comprising:
   a pilot valve having
      a body with an inlet port and an outlet port,
      a first disc, and
      a second disc,
         the discs being configured to move with respect to the body to selectively communicate either the inlet port or the outlet port with a pressure control;
   a solenoid configured to operate the pilot valve; and
   a main valve having an actuator in communication with the pressure control, a main inlet in communication with the inlet port, and a main outlet;
   wherein the pilot valve is configured to facilitate opening the main valve in proportion to an energized level of the solenoid.

2. The valve assembly as set forth in claim 1, wherein the solenoid is configured to move the first disc of the pilot valve toward the body to isolate the inlet port from the pressure control when the solenoid is energized.

3. The valve assembly as set forth in claim 1, wherein the solenoid is configured to move a first holder toward the body when the solenoid is energized, the first holder slidably containing the first disc of the pilot valve.

4. The valve assembly as set forth in claim 1, wherein the solenoid is configured to move the second disc of the pilot valve away from the body to communicate the outlet port with the pressure control when the solenoid is energized.

5. The valve assembly as set forth in claim 1, wherein the solenoid is configured to move a second holder away from the body when the solenoid is energized, the second holder containing the second disc of the pilot valve.

6. The valve assembly as set forth in claim 1, wherein the actuator is configured to move the second disc of the pilot valve toward the body to isolate the outlet port from the pressure control.

7. The valve assembly as set forth in claim 1, wherein the actuator is configured to move a second holder toward the body, the second holder containing the second disc of the pilot valve.

8. The valve assembly as set forth in claim 1, wherein the actuator is configured to move a first holder away from the body and a second holder toward the body, the first holder slidably containing the first disc, and the second holder containing the second disc.

9. The valve assembly as set forth in claim 1, wherein the pilot valve isolates both the inlet port and the outlet port from the pressure control when the pilot valve experiences forces in equilibrium from the solenoid and the actuator.

10. The valve assembly as set forth in claim 1, wherein the actuator and the pilot valve are mechanically linked through a feedback spring.

11. A valve assembly comprising:
    a pilot valve having
       a body with an inlet port and an outlet port,
       a first disc, and
       a second disc,
          the discs being configured to move with respect to the body to selectively communicate either the inlet port or the outlet port with a pressure control;
    a solenoid configured to selectively exert force on the first disc; and
    a main valve having a main inlet, a main outlet, and an actuator with a feedback spring configured to exert force on the second disc;
    wherein the pilot valve is configured to facilitate opening the main valve in proportion to an energized level of the solenoid.

12. The valve assembly as set forth in claim 11, wherein the solenoid is configured to move a first holder toward the body when the solenoid is energized, the first holder slidably containing the first disc of the pilot valve, thereby isolating the inlet port from the pressure control.

13. The valve assembly as set forth in claim 11, wherein the solenoid is configured to move the second disc of the pilot valve away from the body to communicate the outlet port with the pressure control when the solenoid is energized.

14. The valve assembly as set forth in claim 11, wherein the solenoid is configured to move a second holder away from the body when the solenoid is energized, the second holder containing the second disc of the pilot valve.

15. The valve assembly as set forth in claim 11, wherein the feedback spring is configured to move the second disc of the pilot valve toward the body to isolate the outlet port from the pressure control.

16. The valve assembly as set forth in claim 11, wherein the feedback spring is configured to move a second holder toward the body, the second holder containing the second disc of the pilot valve.

17. The valve assembly as set forth in claim 11, wherein the feedback spring is configured to move a first holder away from the body and a second holder toward the body, the first holder slidably containing the first disc to isolate the inlet port from the pressure control, and the second holder containing the second disc to isolate the outlet port from the pressure control.

18. The valve assembly as set forth in claim 11, wherein the pilot valve isolates both the inlet port and the outlet port from the pressure control when the pilot valve experiences forces in equilibrium from the solenoid and the feedback spring.

19. The valve assembly as set forth in claim 11, wherein the pilot valve further includes a rod extending between the discs through the body, the rod communicating force between the solenoid and the feedback spring.

20. A valve assembly comprising:
    a three-way poppet pilot valve having
       a body with an inlet port and an outlet port,
       a first disc,
       a first holder slidably containing the first disc,
       a second disc,
          the discs being configured to move with respect to the body to selectively communicate either the inlet port or the outlet port with a pressure control;
    a solenoid configured to, when energized, move the first holder toward the body, thereby isolating the inlet port from the pressure control, and move the second disc away from the body, thereby communicating the outlet port with the pressure control; and
    a main valve having
       a main inlet in communication with the inlet port,
       a main outlet, and
       an actuator configured to, when the main valve has opened in proportion to an energized level of the solenoid, cause a feedback spring to move the second disc toward the body thereby isolating the outlet port from the pressure control;
    wherein the pilot valve isolates both the inlet port and the outlet port from the pressure control when the pilot valve experiences forces in equilibrium from the solenoid and the feedback spring.

* * * * *